(12) United States Patent
Mathew et al.

(10) Patent No.: US 10,400,053 B2
(45) Date of Patent: Sep. 3, 2019

(54) CARBON PARTICLES COATED WITH POLYMER FILMS, METHODS FOR THEIR PRODUCTION AND USES THEREOF

(71) Applicant: IMERYS GRAPHITE & CARBON SWITZERLAND SA, Bodio (CH)

(72) Inventors: Tony Mathew, Arnhem (NL); Wilma Dierkes, Enschede (NL); Auke Talma, Bathmen (NL); Jacobus Noordermeer, Nieuwstadt (NL); Thomas Gruenberger, Brussels (BE); Nicolaus Probst, Brussels (BE); Rabin Datta, Schalkhaar (NL)

(73) Assignee: Imerys Graphite & Carbon Switzerland SA, Bodio (CH)

( * ) Notice: Subject to any disclaimer, the term of this patent is extended or adjusted under 35 U.S.C. 154(b) by 0 days.

(21) Appl. No.: 15/161,987

(22) Filed: May 23, 2016

(65) Prior Publication Data
US 2016/0340462 A1 Nov. 24, 2016

Related U.S. Application Data

(62) Division of application No. 13/123,426, filed as application No. PCT/EP2009/063211 on Oct. 9, 2009, now Pat. No. 9,373,426.

(30) Foreign Application Priority Data

Oct. 10, 2008 (EP) .................................... 08166358

(51) Int. Cl.
*C09C 1/44* (2006.01)
*C01B 32/21* (2017.01)
(Continued)

(52) U.S. Cl.
CPC ............. *C08F 292/00* (2013.01); *C08J 3/203* (2013.01); *C08K 9/10* (2013.01); *C09C 1/56* (2013.01);
(Continued)

(58) Field of Classification Search
CPC .... C08K 9/10; C09C 1/56; C09C 1/48; H01B 1/04; C08F 292/00; C01B 32/21
(Continued)

(56) References Cited

U.S. PATENT DOCUMENTS 5,986,232 A 11/1999 Howard et al.
6,077,401 A 6/2000 Fields et al.
(Continued)

FOREIGN PATENT DOCUMENTS

DE 102005019301 A1 11/2006
JP 08-291295 11/1996
(Continued)

OTHER PUBLICATIONS

Walden "Modification of the surface chemistry of graphite nanoplatelets and the effect on graphite nanocomposites" (1416133). ProQuest Dissertations & Theses, Michigan State, 2003 (Year: 2003).*
(Continued)

*Primary Examiner* — Tri V Nguyen
(74) *Attorney, Agent, or Firm* — Finnegan, Henderson, Farabow, Garrett & Dunner LLP

(57) ABSTRACT

The present disclosure relates to a composition comprising plasma coated fullerenic soot particles, methods for the preparation thereof, and its use in polymer blends.

20 Claims, 10 Drawing Sheets

Attribution of energy sites I-IV to carbon black microstructures

(51) Int. Cl.

| | |
|---|---|
| *C08F 292/00* | (2006.01) |
| *H01B 1/04* | (2006.01) |
| *C09C 1/56* | (2006.01) |
| *C08J 3/20* | (2006.01) |
| *C08K 9/10* | (2006.01) |

(52) U.S. Cl.
CPC ............ *H01B 1/04* (2013.01); *C01P 2002/88* (2013.01); *C01P 2006/12* (2013.01); *C01P 2006/40* (2013.01); *C08J 2309/02* (2013.01); *C08J 2309/06* (2013.01); *C08J 2323/16* (2013.01); *C08K 2201/001* (2013.01)

(58) Field of Classification Search
USPC .......................... 427/488, 460; 977/737, 738
See application file for complete search history.

(56) References Cited

U.S. PATENT DOCUMENTS

| | | |
|---|---|---|
| 6,099,696 A | 8/2000 | Schwob et al. |
| 2001/0016283 A1* | 8/2001 | Shiraishi ................. B01J 20/20 |
| | | 429/218.2 |
| 2004/0265505 A1 | 12/2004 | Winther-Jensen |
| 2005/0008561 A1 | 1/2005 | Fischer et al. |
| 2006/0091354 A1 | 5/2006 | Van Ooij et al. |
| 2008/0279749 A1 | 11/2008 | Probst et al. |
| 2008/0318026 A1 | 12/2008 | Dai et al. |

FOREIGN PATENT DOCUMENTS

| | | | |
|---|---|---|---|
| JP | 08-291295 A | 11/1996 | |
| KR | 1998-042424 | 8/1998 | |
| WO | WO 2004/083119 A1 | 9/2004 | |
| WO | WO 2006/023921 A2 | 3/2006 | |
| WO | WO-2006116887 A1 * | 11/2006 | ............ C09C 1/043 |
| WO | WO 2007/087708 A1 | 8/2007 | |
| WO | WO 2008/009911 A2 | 1/2008 | |
| WO | WO 2010/040840 A2 | 4/2008 | |

OTHER PUBLICATIONS

Shi JMR "Plasma deposition and characterization of acrylic acid thin film on ZnO nanoparticles." J Mater Res, 17(10), p. 2555 (Year: 2002).*

Shi et al., "Plasma coating of Carbon Nanofibers for Enhanced Dispersion and Interfacial Bonding in Polymer Composites", Applied Physics Letters, vol. 83, No. 25, Dec. 22, 2003, pp. 5301-5303.

Notice of Reasons for Rejection by Japan Patent Office dated Aug. 18, 2015 in corresponding Application No. JP 2014-162282.

Akovali, G., and Ulkem, I., "Some performance characteristics of plasma surface modified carbon black in the (SBR) matrix", Polymer, vol. 40, Elsevier Science Ltd., 1999, pp. 7417-7422.

Nah, Changwoon; Huh, Mong-Young; Rhee, John M.; and Yoon, Tae-Ho, "Plasma surface modification of silica and its effect on properties of styrene-butadiene rubber compound", Society of Chemical Industry, Polymer International, vol. 51, 2002, pp. 510-518.

Tricás, N.; Borrós, S;, and Schuster, R. H. "Carbon Black Modification by Atmosphere Pressure Plasma", Proceedings of the Kautschuk-Herbst-Kolloquium. Hannover, Germany, 2004, pp. 309-316.

Kang, Young C., and van Ooij, Wim J., "RF Plasma Polymerization for Surface Modification of Carbon Black Rubber Filler", American Chemical Society, 2006, 19 pages.

Mathew, T.; Datta, R. N.; Dierkes, W. K.; Noordermeer, J. W.M.; and van Ooij, W. J., "Mechanistic Investigations of Surface Modification of Carbon Black and Silica by Plasma Polymerisation" Plasma Chem Plasma Process, vol. 28, 2008, pp. 273-287.

Journet, C.; Maser, W. K.; Bernier, P.; Loiseau, A.; Lamy de la Chapelle, M.; Lefrant, S.; Denlard, P.; Lee, R.; and Fischer, J. E., "Large-scale production of single-walled carbon nanotubes by the electric-arc technique", Nature, vol. 388, 1997, pp. 756-758.

Thess, Andreas; Lee, Roland; Nikolaev, Pavel; Dai, Hongjie; Petit, Pierre; Robert, Jerome; Xu, Chunhul; Lee, Young Hee; Kim, Seong Gon; Rinzler, Andrew G.; Colbert, Daniel T.; Scuseria, Gustavo E.; Tománek; David; Fischer, John E.; and Smalley, Richard E., "Crystalline Ropes of Metallic Carbon Nanotubes", Science, vol. 273, 1996, pp. 483-437.

Ivanov, V.; Nagy, J. B.; Lambin Ph.; Lucas, A.; Zhang, X.B.; Zhang, X. F.; Bernaerts, D.; Van Tendeloo, G.; Amelickx, S.; and Van Luduyt, J., "The study of carbon nanotubules produced by catlytic method"; Chemical Physics Letters, vol. 223, 1994, pp. 329-335.

Baum, Th.; Löffler, S., Löffler, Ph.; Wellmünster, P.; and Homann, K.-H., "Fullerene Ions and Their Relation to PAH and Soot in Low-pressure Hydrocarbon Flames" Ber. Bunsenges. Phys. Chem., vol. 96, No. 7, 1992, pp. 841-856.

Todorovic-Marković, B.; Marković, Z.; Mohai, I.; Károly, Z., Gáal, L.; Föglein, K.; Szabó, P.T., and Szépvölgyi, J., "Efficient synthesis of fullerenes in RF thermal plasma reactor", Chemical Physics Letters, vol. 378, No. 3-4, 2003, pp, 434-439.

English translation of Search Report of Office Action for related Chinese Application No. 200980149600.1, dated Feb. 18, 2013.

Schröder PhD., Andreas, Thesis "Charakterisierung verschiedener Rußtypen durch systematische statische Gasadsorption" University of Hannover, Hannover, Germany, 2000, 190 pages.

Zhu et al. ("Characterization of combustion fulierene soot, C60, and mixed fullerene." Carbon, 42, pp. 1463-1471, Online Mar. 16, 2004).

He et al. ("Plasma Coating and Enhanced Dispersion of Carbon Nanotubes." MRSSP, 791 pages Q10.7.1-7, 2004).

Ginzburg et al. ("X-ray Diffraction Analysis of C60 Fullerene Powder and FUllerene Soot." Tech Phy, 50, 1458-1461 2005).

Cao et al. ("Free-Radical Copolymerization of Fullerenes with Styrene." Macromolecules, 28, pp. 3741-3743, 1995).

Wang et al. ("Polymers containing fullerene or carbon nanotube stiuctures." Prog. Polym. Sc., 29, pp. 1079-1141. online Oct. 5, 2004).

English-language Abstract of Kono, M., and Yamamoto, M., "Carbon@ Fine Powder Fluid Low Initial Viscosity Contain Soot Base Material Coating Insulate Resin Layer", 1997, XP-002515510.

International Search Report and Written Opinion dated Apr. 29, 2010, in International Application No. PCT/EP2009/063211, filed Oct. 9, 2009.

* cited by examiner

Functional groups on the surface of carbon black.

Schematic representation of vertical plasma reactor

Resistivity of coated versus uncoated fullerenic soot samples.

Payne effect in SBR at various fullerenic soot loadings.

Percentage reduction of Payne effect in different rubbers.

Stress-strain curve of SBR with 40phr plasma-coated fullerenic soot.

Stress-strain curve of NBR with 40phr plasma-coated fullerenic soot.

Stress-strain curve of EPDM with 40phr plasma-coated fullerenic soot.

CARBON PARTICLES COATED WITH POLYMER FILMS, METHODS FOR THEIR PRODUCTION AND USES THEREOF

This application is a divisional application of U.S. application Ser. No. 13/123,426, filed on Oct. 24, 2011, which is a U.S. national stage entry under 35 U.S.C. § 371 from PCT International Application No. PCT/EP2009/063211 filed Oct. 9, 2009, and claims priority to and the benefit to the filing date of EP Application No. 08166358.5, filed Oct. 10, 2008, all of which are incorporated herein by reference.

SUMMARY OF THE INVENTION

The present invention relates to a composition comprising plasma coated fullerenic soot particles, methods for the preparation thereof, and their use in polymer blends.

BACKGROUND OF THE INVENTION

Carbon black is used as conductive additive to polymers, thermoplastics and rubbers. Polymer/carbon black composites usually show a very typical percolation behavior. The electrical resistivity of the composite follows a curve as shown in FIG. 1.

As illustrated in FIG. 1, the addition of carbon black to a polymer composition is, up to a certain level, without any effect on the DC resistivity, then suddenly the resistivity drops to a low level and evolves further only very slowly, which is well-known phenomenon in the art. The influence of the type of carbon black chosen as a filler is typically only on the concentration needed to achieve the percolation effect, while the resulting resistivity of the polymer/carbon black blend remains at a constant level, regardless of the type of carbon black added as a filler. In some applications, a conductive polymer is, however, not desirable, and the filler should only be used as an antistatic modifier to nonconductive polymers.

Carbon black is also commonly employed as a filler in elastomer (rubber) blends. Such Rubber blends have a great importance in, e.g., the tire industry. Since different rubbers have different types of responses to stress, blending of selected rubbers has been practiced to meet the need of the contradictory set of properties, i.e. yielding rubber products with the desired properties. Blending also improves the processability of rubbers and may overall reduce costs of production.

Rubbers are hardly used in their pure form. They are commonly mixed with reinforcing fillers, non-reinforcing fillers, plasticizers, process aids, antioxidants and vulcanization ingredients to provide the required physical properties and to bring about an optimum level of vulcanization. In contrast, thermoplastics are mixed with few ingredients such as fillers, stabilizers and process aids and are processed at a temperature above their melting point or glass transition temperature.

In fact, carbon black is one of the most important active fillers used in the rubber industry for improving the mechanical and dynamic properties of rubbers. The behavior of these fillers in rubber matrices is very different, mainly because of the difference in their surface characteristics. The surface characteristics of the filler have an important contribution towards the wetting behavior, interaction with the rubber matrix, reagglomeration in the matrix, etc.

One problem commonly encountered with carbon black fillers is that the surface energy of conventional carbon black is normally higher than that of various elastomers like Styrene-Butadiene rubber (SBR), Butadiene rubber (BR), and Ethylene-Propylene-Diene rubber (EPDM). With a large surface energy difference between filler and rubber, the filler-filler interaction increases, which in turn has a negative influence on the stability of the dispersion state attained during mixing. Reducing the surface energy and chemistry to the range of various rubbers may aid in compatibilizing these fillers.

In order to modify the surface energy and properties of the carbon black particles, attempts have been made to coat the carbon black particles with a polymer layer. The creation of a polymer film on the surface results in an altered contact resistance and contact capacity. In other words, polymer/carbon black blends employing polymer coated carbon black show an increased DC resistivity compared to polymers or blends with non-modified carbon black fillers because the electrons will have to tunnel through the additional surface polymer layer of the particle to interact with the surrounding filler particles or polymers.

Surface modification of carbon black by polymerization is generally known in the art. Polymerization of carbon black by conventional polymerization reactions (dissolving the monomer in a suitable solvent, contacting the monomer solution and possible additives with the carbon black particles and subsequent evaporation of the solvent (mostly by heating) to form a polymer layer on the surface of the particles) has been described in the art. For example, depositing epoxy or phenol resins onto the surface of fullerenic soot containing carbon black in the presence of solvents is described in Japanese Published Unexamined Application No. 1996-291295 (JP 08 291295 A) to Tokai Carbon KK.

Conventional polymerization has, however, a number of disadvantages, such as the requirement to apply heat to achieve the immobilization of the layer on the surface, and the unwanted presence of residual solvents or of other additives used to accomplish the polymerization in the final product.

Plasma polymerization has emerged as a surface modification technique for metals, polymers and powders. Plasma polymerization is different from the conventional polymerization processes. The polymer formed from plasma polymerization and conventional polymerization generally differ widely in chemical composition, as well as chemical and physical properties, even if the same monomers are used for polymerization. This uniqueness of plasma polymers results from the reaction mechanism of the polymer forming process.

The technique involves electric field bombardment of monomer molecules, thereby creating active monomer species, which then react with the surface to form a film on the substrate. As a result, the surface properties of the substrate change dramatically. By suitable selection of monomers, a substrate can either be made hydrophobic or hydrophilic. Plasma polymerization can be carried out at ambient temperature and does not require any solvents for the process, making it a clean process.

The surface of carbon black is known to consist of graphitic planes (site I), amorphous carbon (site II), crystallite edges (site III), and slit shaped cavities (site IV). The conduction electrons associated with the graphitic structure play an important role in the amount of energy associated with these sites. Recently, Schroder et al. [1] quantified the different energies at these sites on the surface of carbon black by analyzing adsorption isotherms of various molecules. According to their analysis, particularly the crystallite edges (III) and slit shaped cavities (IV) on the surface of carbon black are the sites of high concentration of π-electrons (see FIG. 2). These sites are most important with respect to rubber-filler and filler-filler interaction. The conduction electrons associated with the graphitic structure play an important role in the amount of energy associated with these sites.

Furthermore, the surface of carbon black is also covered with functional groups like carboxyl, phenol, lactones and quinonic groups (see FIG. 3). These are preferably located at the edges of the graphitic basal planes or at the crystallite edges.

When carbon black is exposed to plasma, the following processes can occur:

C—C bond breakage in the graphitic planes.

Due to breakage of these C—C bonds, radicals are generated on the graphitic planes. However, the graphitic structures are stabilized by resonance. As soon as radicals are generated, they will reform the bond and return to their stable state.

The breakage of C—O bonds and other functional groups, located at the crystallite edges. As soon as a C—O bond or another functional group located at the crystallite edges is broken, monomer active species can attach on to these sites, which is more favourable.

Successful attachment of the monomer active species only happens at the sites generated at the crystallite edges, i.e., at the sites generated by the bond breakage of the functional groups. For furnace carbon blacks, the concentration of these active sites (II-IV) varies between 5-20% on the surface, and the other 95-80% contribution is from graphitic planes. Furnace carbon blacks with higher surface area and lower particle size has more fractions of these energetic sites (sites II-IV). As the surface area decreases and particle size increases and the fraction of these sites decreases.

The extension of plasma polymerization as a surface modification technique for fillers like carbon black and silica for application in rubber evolved quite recently. Nah et al. [2] reported plasma polymerization on silica and its effect on rubber properties. Akovali et al [3]. and Tricas et al [4,5] reported the modification of carbon black by plasma polymerization. The monomers used for the process were acrylic acid, styrene and butadiene. Their findings led to the conclusion that carbon black was modified successfully, with the coating covering all sites on the surface of carbon black. Kang et al, [6] also reported on the modification of carbon black by plasma polymerization and concluded that it is possible to manipulate the surface properties.

However, it was found that not all types of carbon black can be successfully subjected to plasma polymerization, and that most carbon blacks are coated only with very low amounts of plasma polymer compared to silica, leading to insufficient changes of their surface properties (see, for example, Mathew et al. [7]). Other problems observed were low uniformity of the plasma polymer coated particles, long treatment times and poor reproducibility for various types of carbon black.

LITERATURE REFERENCES

[1] A. Schroder, PhD Thesis, University of Hannover, Deutsches Institut für Kautschuktechnologie, Hannover Germany, (2000)
[2] C. Nah, M. Y. Huh, J. M. Rhee, and T. H. Yoon, Polym. Int. 51, 510, (2002)
[3] G. Akovali and I. Ukem, Polymer 40, 7417 (1999)
[4] N. Tricas, E. Vidal-Escales, S. Borros, and M. Gerspacher, 16th Conference of International Society of Plasma Chemistry, Taormina, Italy (2003)
[5] N. Tricas, S. Borros and R. H. Schuster, Proceedings of the Kautschuk-Herbst-Kolloquium, Hannover Germany, (2004)
[6] Y. C. Kang and W. J. van Ooij, Proceedings ACS Rubber Div. Fall Meeting, Cincinnati, Paper 67 (2006)
[7] T. Mathews, R. N. Datta, W. K. Dierkes, J. W. M. Noordermeer, W. J. van Ooij, Plasma Chem Plasma Process, 28, 273-287 (2008)

Having regard to the state of the art, there remains a need for surface modified carbon black compositions that can be successfully and reproducibly prepared by plasma polymerization techniques.

SUMMARY OF THE INVENTION

The inventors have now surprisingly found that when carbon particles of fullerenic soot are employed in a plasma polymerization process, the process can be carried out reliably and with good efficiency, resulting in plasma polymerized carbon black composition having advantageous properties over products obtained through conventional polymerization techniques. Furthermore, it has been found that a modification of the plasma polymerization conditions allows properties such as resistivity/conductivity of the product to be adjusted to achieve a wide range of desired properties of the compositions. In the context of the present invention, such compositions are referred to as plasma coated fullerene soot or PCFS.

In one embodiment, the present invention provides a composition comprising carbon particles of fullerenic soot, characterized in that the carbon particles of fullerenic soot carry a coating of a layer consisting of a plasma polymerized monomer on a core carbon particle.

In certain embodiments, the PCFS composition is characterized in that the layer of polymerized monomer represents 1.0-30%, preferably 1.5-20%, or more preferably 1.5-8.0% of the mass of the particle. The mass of the polymerized monomer layer is conveniently determined by thermogravimetric analysis.

In further embodiments, the PCFS composition is characterized in that the surface energy of the carbon particles is less than 65.0 mJ/m$^2$, or less than 60.0 mJ/m$^2$, or less than 57.0 mJ/m$^2$. In other embodiments, the PCFS composition is characterized in that the electrical resistivity thereof is higher than 0.4 Ohm, cm.

In yet further embodiments, the PCFS composition is characterized in that the core carbon particles are fullerene soot particles produced by high temperature plasma using graphite or other carbon allotropes as precursor. In other embodiments, the composition is characterized in that the core carbon particles are fullerene soot particles produced by radio frequency (RF) plasma using carbon black, graphite or other carbon allotropes as precursor. Alternatively, the core carbon particles are fullerene soot particles produced by a combustion process or by an arc process or laser ablation.

In certain embodiments, the layer of polymerized monomer consists of a polymerized hydrocarbon monomer, where the monomer comprises at least one carbon-carbon double bond. In a specific embodiment, the monomer is acetylene.

The PCFS compositions of the present invention are obtainable by a process of plasma polymerization of the monomer on the surface of the core carbon particles of fullerenic soot.

Thus, another aspect of the present invention is the provision of a process for the preparation of a PCFS composition as described above, characterized by carrying out a plasma polymerization of the monomer on the core carbon particle of fullerenic soot in a plasma polymerization reactor.

In yet another aspect of the invention, blends are provided comprising a PCFS composition as described above, and one or more polymers. In certain embodiments, the polymer is a natural or synthetic elastomer, preferably selected from the group consisting of natural rubber, styrene-butadiene-rubber, acrylonitrile-butadiene-rubber, or ethylene-propylene-diene rubber.

In certain embodiments of this aspect of the invention, the blend is characterized in that the ultimate resistivity is within the range between 103 and 1013 Ohm·cm. In any event, the blends comprising a PCFS composition as provided by the present invention are characterized by a higher resistivity compared to compositions containing non-polymerized carbon particles, even with otherwise similar components.

In yet another aspect of the present invention, the plasma coated fullerenic soot in the blend is used to compatibilize polymers with low affinity to each other and differing affinity to the carbon filler.

DETAILED DESCRIPTION OF THE PRESENT INVENTION

Figure 1:
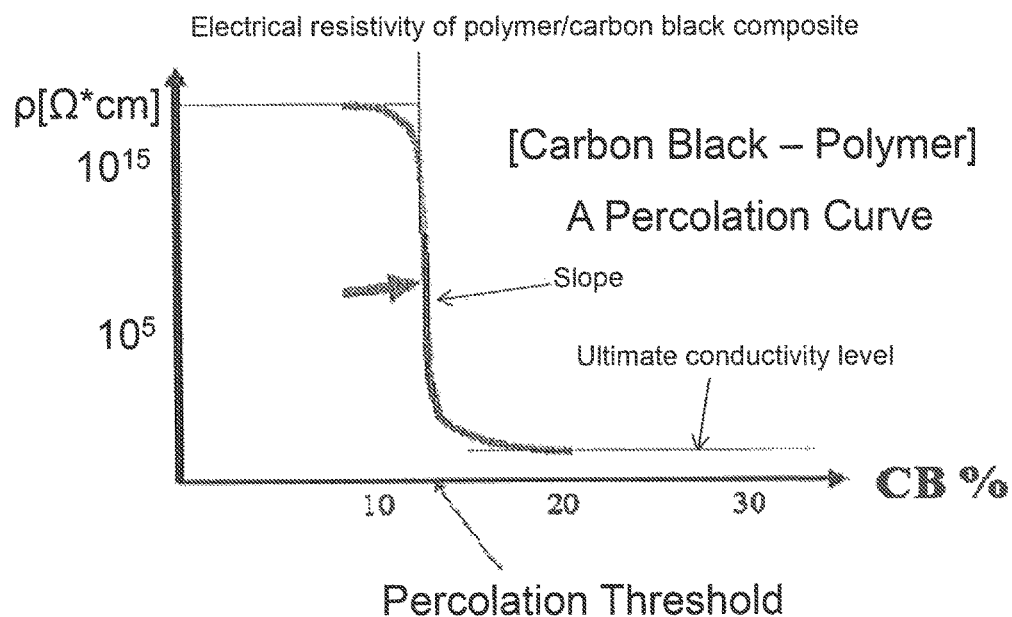
FIG. 1 shows the electrical resistivity curve of polymer/carbon black composite.
Figure 2:
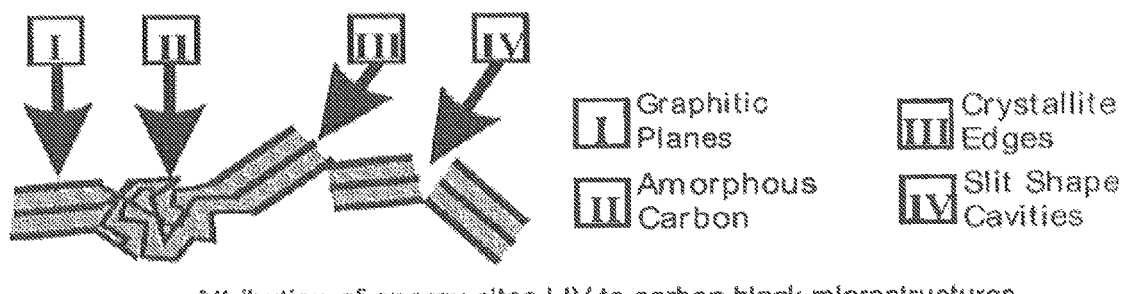
FIG. 2 shows the attribution of energy sites I-IV to carbon black microstructures.
Figure 3:
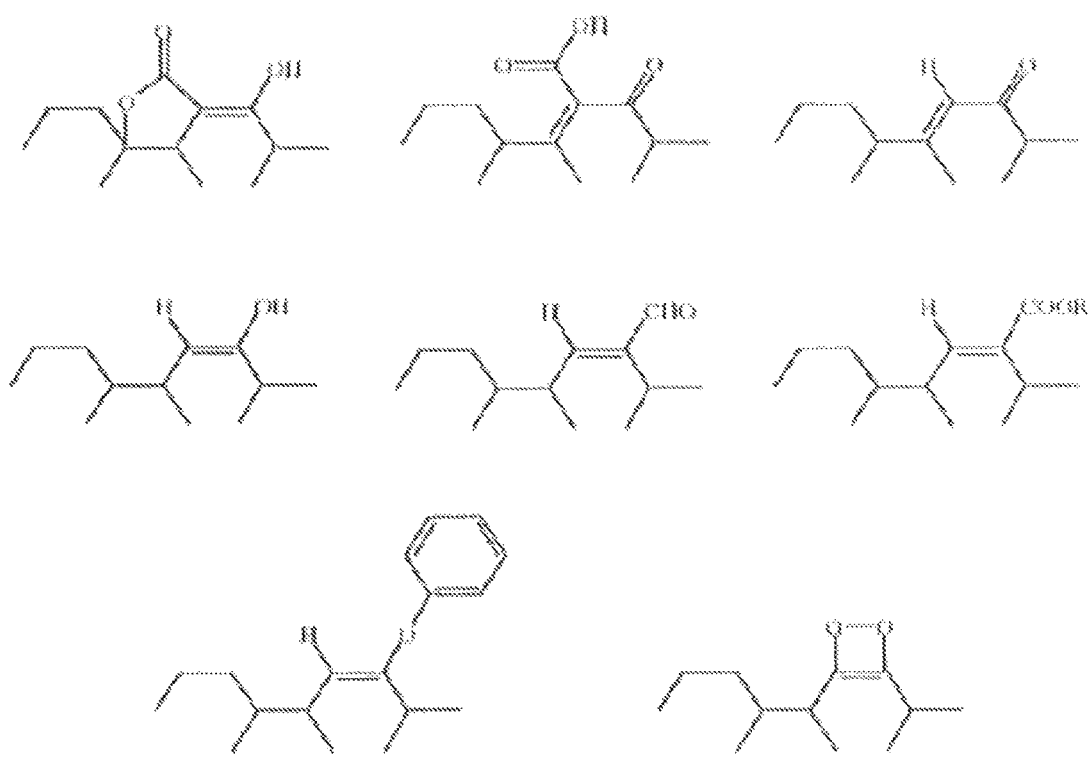
FIG. 3 shows functional groups on the surface of carbon black.

One of the aims of the present invention is to provide a reliable and convenient process to modify the surface of carbon particles by a plasma polymerization process in order to deposit a polymeric layer on its surface for applications in a variety of applications, including antistatic nonconductive polymers or rubber and rubber blends. The technique involves plasma polymerization which involves electric field bombardment of monomer molecules, thereby creating active monomer species, which then react with the surface of the carbon particles of fullerenic soot (FS) to form a film over the substrate. As a result of this modification, the surface properties of the FS substrate change dramatically. By selecting suitable monomers, a substrate can either be made hydrophobic or hydrophilic. The PCFS compositions obtained by the process of the present invention can be used, for instance, as a filler in tires.

Surprisingly, it has been found that when fullerenic soot carbon particles are used in the plasma polymerization process, the changes in the surface properties of the compositions can be achieved faster than observed for conventional carbon black particles. For example, a composition comprising conventional carbon black particles requires a four hours treatment in an acetylene plasma to reach the same value of surface tension obtained with a fullerenic soot carbon particle composition in an acetylene plasma for one hour (see Example 2).

Fullerenic Soot

The term "fullerenic soot" as used herein is to be understood equivalent to "carbon containing residue from fullerene production and carbon nanostructures production", and means a residue which comprises a substantial proportion of fullerene-type nanostructures. The proportion of fullerene-type carbon compounds is determined via the presence of 5- or 6-membered carbon rings which lead to curved layers of carbon on the carbon black surface. The proportion of fullerene-type carbon nanostructures here is usually approximately 100%, but can be less. The decisive factor is the requirement to permit functionalization which brings about a significant change in the properties of the carbon black. The proportion is preferably from 80% to 100%. This preferred proportion can change with the application, however.

In principle, any of the known processes for fullerene production and/or carbon-nanostructures production is suitable for obtaining the carbon-containing residue.

Furnace blacks or carbon blacks from other processes are also suitable as long as the fullerene-type residues on the surface are present.

According to one preferred embodiment, the carbon-containing residue is obtained via ablation of a carbon electrode by means of an electric arc, a laser, or solar energy. A process for electric arc ablation is described by Journet, C. et al., Nature 388 (1997), 756. A process suitable for laser ablation of carbon and production of a carbon-containing residue is for example described in Thess, A. et al., Science 273 (1996), 483. A process suitable for production of carbon-containing residue via chemical vapor deposition using hydrocarbons is furthermore described in Ivanov et al., Chem Phys. Lett. 223, 329 (1994). Another production process using plasma technology is described in Taiwanese Patent Application No. 93107706 and a suitable solar energy process for the production of a carbon-containing residue is described in Fields et al., U.S. Pat. No. 6,077,401.

The carbon-containing residue can be obtained via incomplete combustion of hydrocarbons. By way of example, fullerene production has been observed in flames derived from premixed benzene/acetylene (Baum et al., Ber. Bunsenges, Phys. Chem. 96 (1992), 841-847). Other examples of hydrocarbons suitable for combustion for the production of a carbon-containing residue are ethylene, toluene, propylene, butylene, naphthalene or other polycyclic aromatic hydrocarbons, in particular petroleum, heavy oil and tar, and these can likewise be used. It is also possible to use materials which are derived from carbon, from carrageen and from biomass and which mainly comprise hydrocarbons. However, they can also comprise other elements, such as nitrogen, sulphur and oxygen. U.S. Pat. No. 5,985,232 describes a particularly preferred process for combustion of hydrocarbons.

According to another embodiment, the carbon-containing residue can be obtained via treatment of carbon powder in a thermal plasma alongside fullerenes. As an alternative, the carbon-containing residue can be obtained via recondensation of carbon in an inert or at least to some extent inert atmosphere.

By way of example, EP 0 682 561 A1 describes a process for the conversion of carbon in a plasma gas. Fullerenes, and also carbon nanotubes, can likewise be produced via this process.

The carbon-containing residue is preferably produced via the following steps, preferably in this sequence:

A plasma is generated with electrical energy.

A carbon precursor and/or one or more catalysts and a carrier plasma gas are introduced into a reaction zone. This reaction zone is, if appropriate, in an airtight vessel that withstands high temperatures.

The carbon precursor is to some extent vaporized at very high temperatures in this vessel, preferably at a temperature of 4000° C. or higher.

The carrier plasma gas, the vaporized carbon precursor and the catalyst are passed through a nozzle whose diameter narrows, widens, or else remains constant in the direction of the plasma gas flow.

The carrier plasma gas, the vaporized carbon precursor and the catalyst are passed through the nozzle into a quenching zone for nucleation, growth and quenching. This quenching zone is operated with flow conditions produced via aerodynamic and electromagnetic forces, so as to prevent any noticeable return of starting material or products from the quenching zone into the reaction zone.

The gas temperature in the quenching zone is controlled at from about 4000° C. in the upper part of this zone to about 800° C. in the lower part of this zone.

The carbon precursor used can be a solid carbon material which involves one or more of the following materials: carbon black, acetylene black, thermal black, graphite, coke, plasma carbon nanostructures, pyrolitic carbon, carbon aerogel, activated carbon or any desired other solid carbon material.

As an alternative, the carbon precursor used can be a hydrocarbon, preferably composed of one or more of the following: methane, ethane, ethylene, acetylene, propane, propylene, heavy oil, waste oil, or of pyrolysis fuel oil or of any other desired liquid carbon material. The carbon precursor can also be any organic molecule, for example vegetable fats, such as rapeseed oil.

The gas which produces a carbon precursor and/or produces the plasma involves and is composed of one or more of the following gases: hydrogen, nitrogen, argon, helium, or any desired other pure gas without carbon affinity, preferably oxygen-free.

With respect to other process variants, reference is made to WO 04/083119, the disclosure content of which is incorporated herein by reference in its entirety.

In preferred embodiments, the carbon precursor is selected from carbon black, graphite, another carbon allotrope or a mixture thereof.

Alternatively, functionalized fullerenic soots may be used for the purpose of the present invention. It is known, e.g., from International Patent Application WO 2006/114419 that a functionalization reaction can be carried out during or after the production process of fullerenic soot, and the functionalized fullerenic soots obtained thereby are also encompassed by the term "fullerenic soot" as used herein.

The functionalization reactions here involve one or more of the following reactions:

Hydroxylation of the residue, preferably via an oxidant, the oxidant particularly preferably being potassium permanganate.

Reaction of the residue with ammonia, obtaining amino groups.

Reaction of the residue with alkyl- or arylamines.

Reaction of the residue with ozone, forming ozonides and subsequently forming carbonyl compounds.

Treatment of the residue with a halogenating agent, the halogenating agent preferably being chlorine or bromine.

Subjection of the residue to a cycloaddition reaction,

Subjection of the residue to a Grignard reaction,

Hydrogenation of the residue.

Subjection of the residue to an electrochemical reaction.

Subjection of the residue to a Diels-Alder reaction.

Formation of donor-acceptor molecule complexes.

Other functionalization reactions suitable alongside the abovementioned reactions are any of those known from the prior art in connection with fullerenes.

Process of Plasma Polymerization

Figure 4:
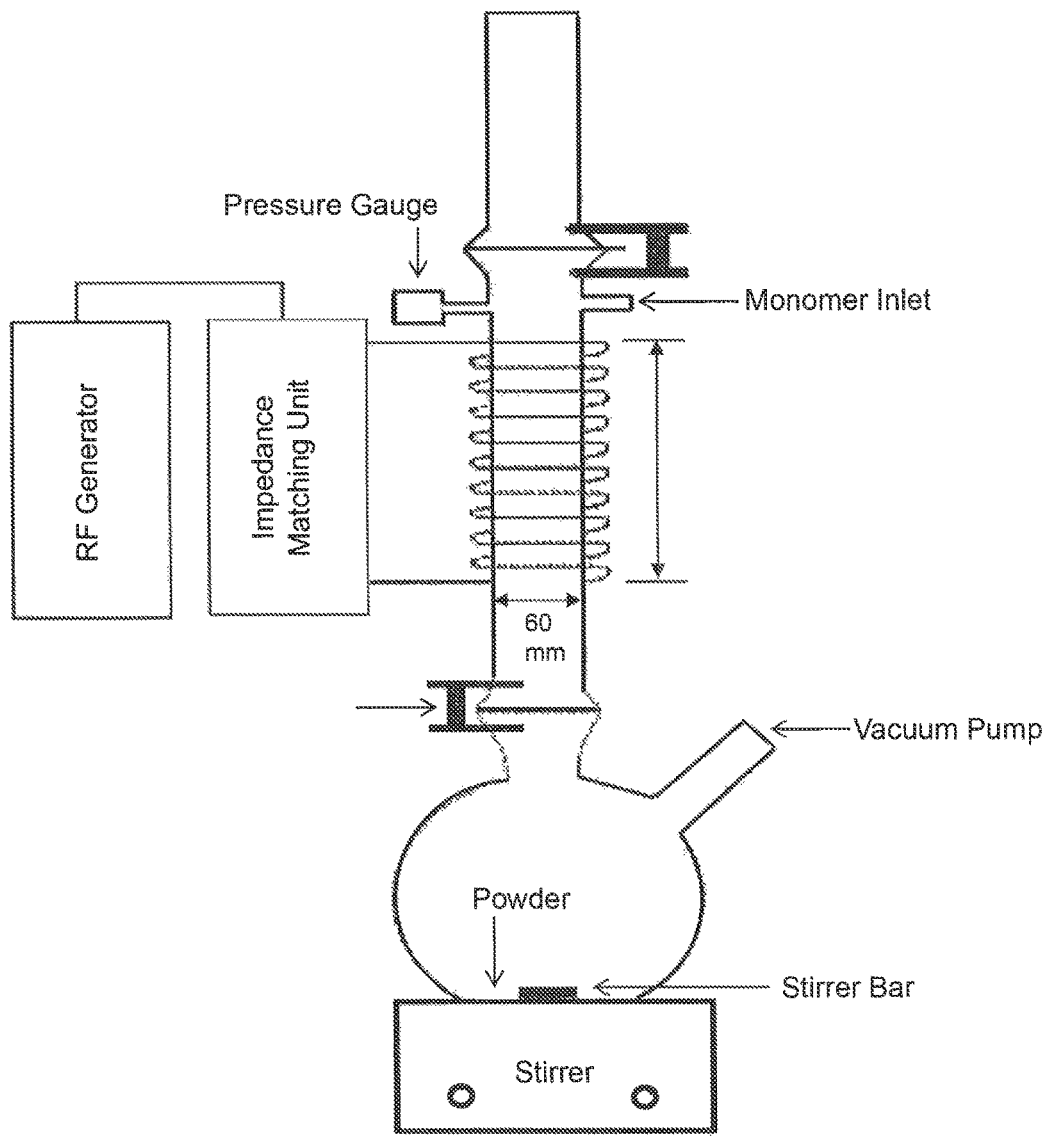
FIG. 4 shows a schematic representation of a vertical plasma reactor suitable for the processes of the present invention.
Figure 5A:
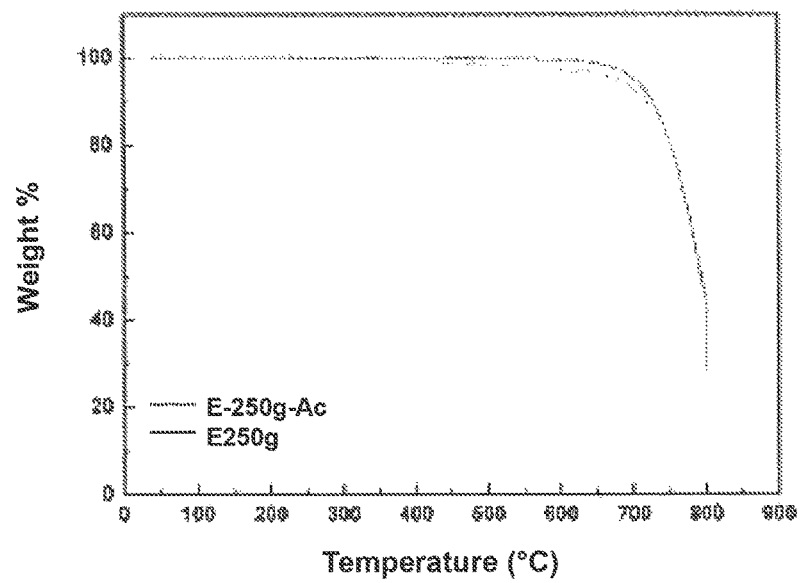
FIG. 5A shows the TGA thermograms of E-250g & E-250g Ac carbon particles before and after plasma polymerization of acetylene on the surface thereof.
Figure 5B:
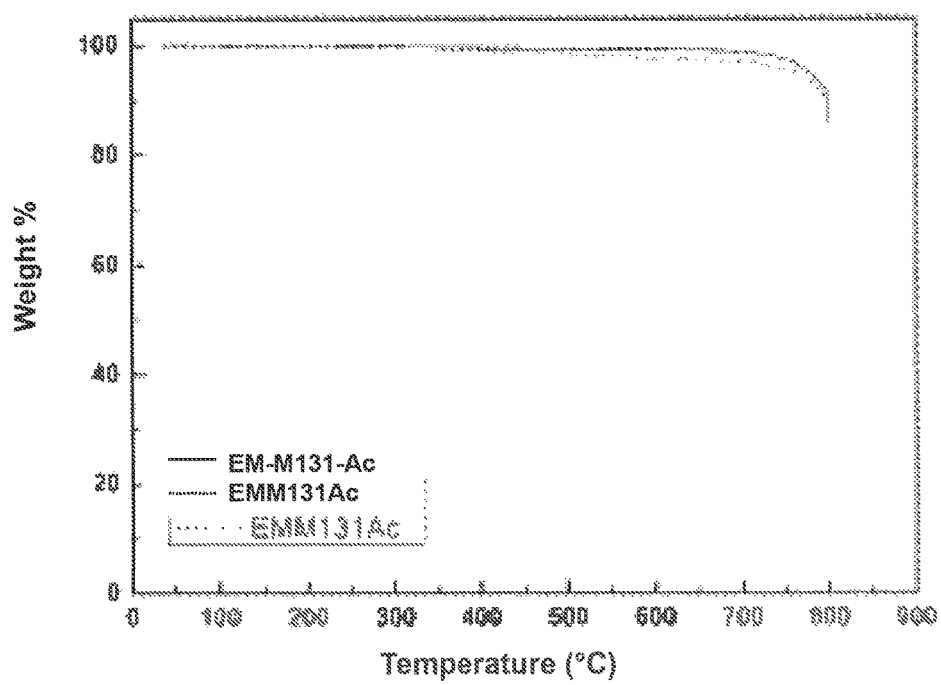
FIG. 5B shows the TGA thermograms of E-MM131 & E-MM131 Ac carbon particles before and after plasma polymerization of acetylene on the surface thereof.
Figure 5C:
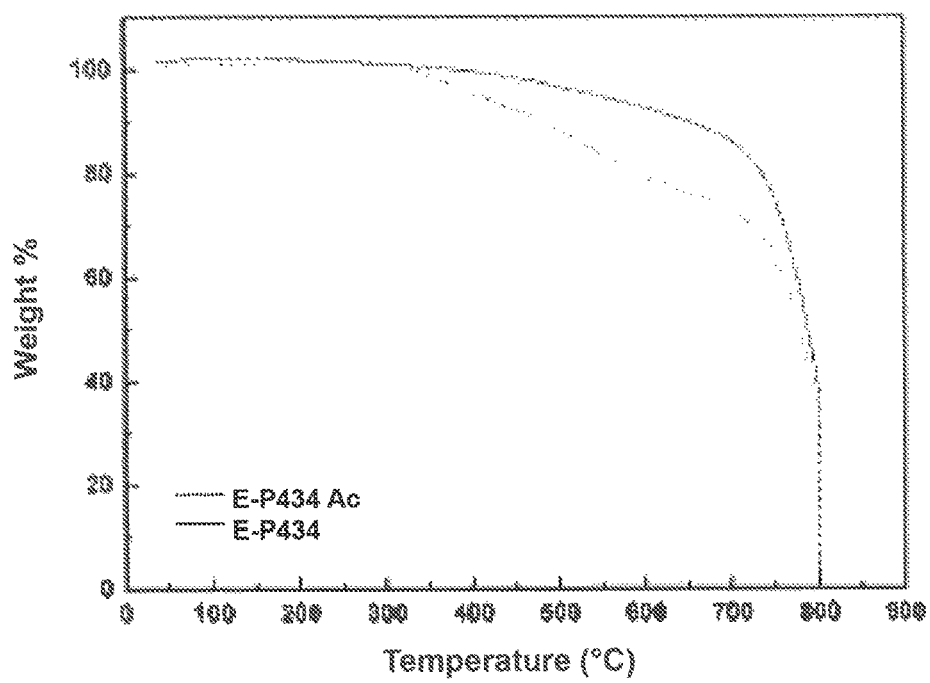
FIG. 5C shows the TGA thermograms of E-P434 & E-P434 Ac carbon particles before and after plasma polymerization of acetylene on the surface thereof.
Figure 5D:
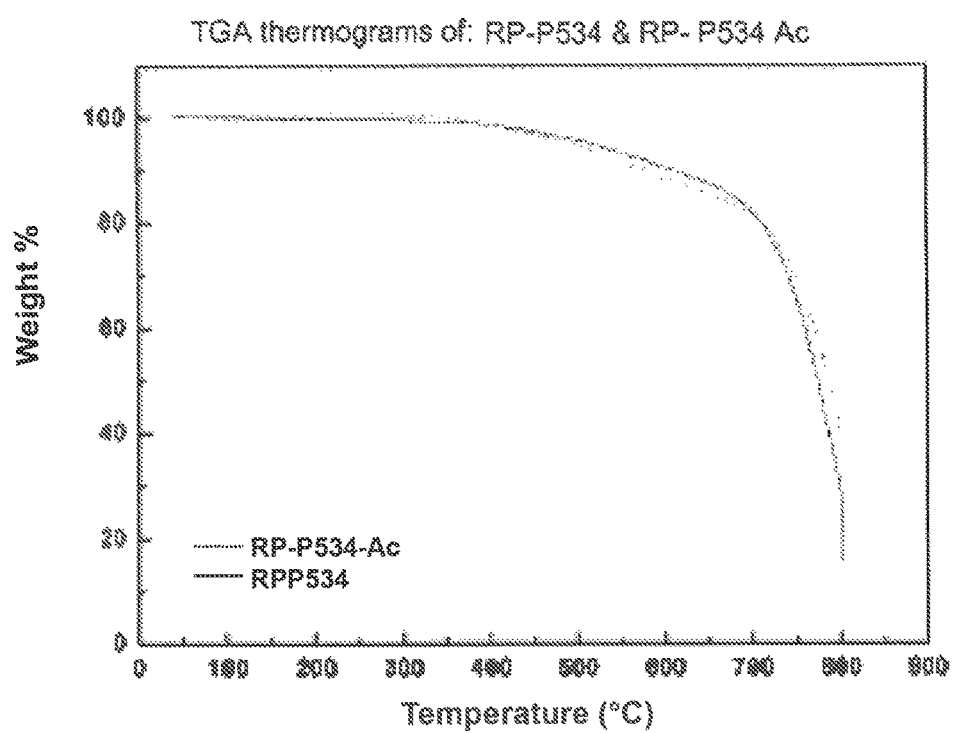
FIG. 5D shows the TGA thermograms of RP-P534 & RP-P534 Ac carbon particles before and after plasma polymerization of acetylene on the surface thereof.
Figure 5E:
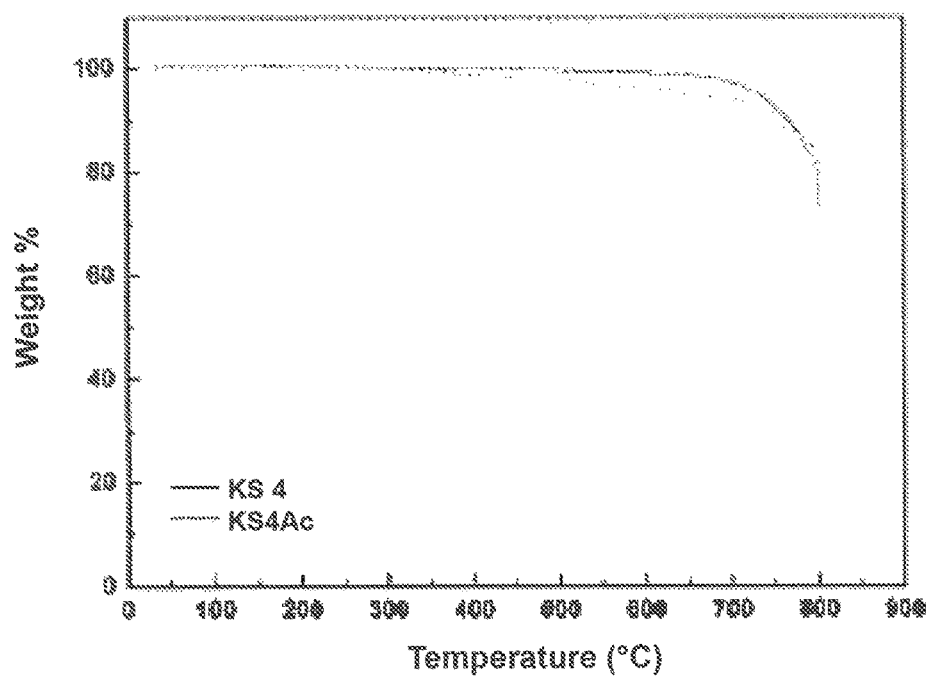
FIG. 5E shows the TGA thermograms of KS4 & KS4 Ac carbon particles before and after plasma polymerization of acetylene on the surface thereof.
Figure 5F:
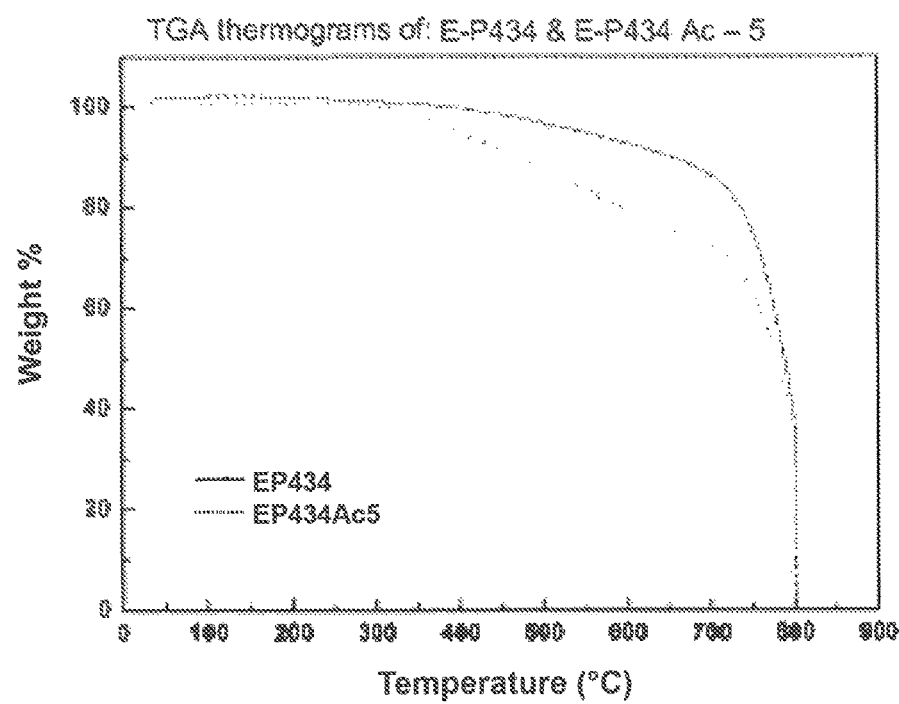
FIG. 5F shows the TGA thermograms of E-P434 & E-P434 Ac-5 carbon particles before and after plasma polymerization of acetylene on the surface thereof.

Generally, plasma polymerization according to the present invention can be carried out in any suitable plasma reactor. Various types of plasma reactors are known to the skilled person. In one embodiment of the invention, the plasma polymerization is performed in a radio frequency (RE) plasma vertical reactor. A schematic representation of this reactor is shown in FIG. 4.

In a specific embodiment, the reactor consists of a round bottom flask attached with a long tubular region. Plasma is generated with the help of a 13.56 MHz Radio frequency (RF) plasma generator (MKS-ENI ACG 3B). Typically, a power output of 80-250 watts is used, (see Table I and V). This is connected to an automatic impedance matching unit (MKS MWH-5) which in turn is connected to a copper coil wound on to the long tubular region of the reactor. The powders are kept at the bottom of the chamber and stirred with the help of a magnetic stirrer in order to expose the powder particles uniformly to plasma. The system is evacuated to a pressure of 30 mTorr. The monomer is injected into the reaction chamber under steady flow conditions. The monomer flow is monitored by a mass flow controller (MKS-1179A) and the system pressure is monitored by a temperature regulated capacitance manometer (MKS-627B). As the desired monomer pressure is attained RF power is applied.

The RF thermal plasma technology for the production of fullerene soot is described, e.g., in Tororovic-Markovic B., Markovic S., Mohai I., Karoly Z., Gal L., Foglein K., Szabo P. I., Szepvoglyi J.; Chemical Phys. Letters, 2003, vol. 378, no 3-4, pp. 434-439.

In the plasma polymerization process, monomer molecules gain high energy from electrons, ions, and radicals and are fragmented into activated small fragments, in some cases into atoms. These activated fragments are recombined, sometimes accompanying rearrangement, and the molecules grow to large-molecular weight ones in a gas phase or at the surface of substrates. The repetition of activation, fragmentation, and recombination leads to polymer formation. In conventional polymerization the monomer molecules are linked together through chemical reactions without any alteration of chemical structure of the monomer. Therefore the chemical structure of the polymer formed by conventional polymerization is well predicted by the structure of the monomer. In contrast, in the case of plasma polymerization, the structure of the polymer is cannot be clearly predicted from the structure of monomers.

In an extreme case, the starting molecule is fragmented into atoms and restructured into large molecules. Thus, the sequence and chemical structure of the formed polymer chains is not identical to that of the starting molecule. How the starting molecules are fragmented into activated small fragments depends on the level of plasma and the nature of the starting molecules. This is a reason why the plasma polymers possess different chemical composition when the plasma polymerization is operated at different conditions such as monomer flow rate, radio frequency (RF) power and pressure of the reaction chamber, even if the same starting materials are used for the plasma polymerization.

Upon modifying the carbon particles by plasma polymerization, a cross-linked polymeric film is formed on the surface. A plasma polymer will contain an appreciable amount of trapped radicals, and upon exposure to atmospheric conditions after the polymerization process, the plasma polymer can easily get oxidized—giving rise to the presence of oxygen on the surface. The respective concentrations of carbon and oxygen on the surface of the coating can be easily determined by x-ray photoelectron spectroscopy.

The classes of monomers most commonly encountered in plasma polymerization are:
1. Hydrocarbons These need not contain conventionally polymerizable groups. Typical examples include acetylene, ethylene, ethane, methane, cyclohexane, benzene, styrene and butadiene. However there will be differences between the performances of these monomers. Polymerization will proceed slower in the case of saturated systems. Also in the case of ethylene, the window under which plasma polymerization can be carried out is very narrow. Outside this region, there could be the formation of plasma polymer powder or an oily film.
2. Hydrocarbons with Polar Groups These may be used to form a more polar plasma polymer. Monomers such as acrylic acid, allyl amine, pyridine, vinyl pyridine, allyl alcohol etc are used for this purpose.
3. Hydrocarbons with Hetero-Molecules, Monomers such as pyrrole, thiophene, furan can be used.
4. Fluorocarbons Typical monomer used include perfluorohexane, octafluorotoluene, sulphur hexafluoride, tetrafluoroethylene are used.

5. Silicon Containing Monomers

This includes tetramethylsilane (TMS), tetraethoxysilane (TEOS), hexamethyldisiloxane (HMDSO) etc.

The selection of the monomers always depends on the type of the plasma polymer required and the practical feasibility of the polymerization process. In general, all of the above-mentioned monomers are contemplated in the context of the present invention.

Some Advantages of Plasma Polymerization of Carbon Particles

1. Very thin uniform films capable of modifying the surface properties of the carbon particles can be generated. For fullerenic soot this is typically in the range of 3-9 nm on a core carbon particle (see Example 1).

2. The process is highly versatile since both, a variety of different monomers and different reactor conditions can be applied in order to achieve a specific surface property.

3, Since no solvent or catalyst is required for the polymerization, it is possible to form a layer of polymerized monomer having no impurities derived from the solvent or a catalyst.

4. Plasma polymerization can be carried out at ambient temperature. For example, a radio frequency (RF) plasma vertical reactor can be used which is operated at a typical power output of 80-250 watts (see Table I and V).

In summary, the surface modification of fullerenic soot obtained by a conventional polymerization process is very different from the chemical modification achieved by plasma polymerization. Accordingly, the present invention describes processes capable of achieving surface modifications of fullerenic soot which could not have been achieved with conventional polymerization.

To the best of applicants knowledge, processes for modifying fullerenic soot by plasma polymerization has not been described in the prior art. Of course, the same is true for the PCFS compositions obtainable by this process.

EXAMPLES

Example 1: Plasma Coating Process

The following carbon samples were used for the experiments:
1. Ensaco 25 Og: conductive carbon black
2. E-MM131: graphitized E-250g
3. EP-P434: fullerenic carbon black with precursor E-250g
4. KS 4: primary synthetic graphite
5. RP-P534: fullerenic graphite Ensaco 250 and KS4 were commercially available products of Timcal S.A. E-MM-131, EP 434 and RP534 were experimental products of Timcal S.A.

The detailed process conditions for the treatment of the above carbon types in the radio frequency (RF) plasma vertical reactor are given in Table I. The plasma vertical reactor was of the size and type as shown in FIG. 4.

TABLE I

Experimental conditions for the plasma polymerization process.

| Sample Code | RF Power (watts) | Acetylene concentration (milliTorr) | Treatment time (hrs) |
| --- | --- | --- | --- |
| E-250 | 250 | 200 | 1 |
| E-MM131 | 250 | 200 | 1 |
| EP-P434 | 250 | 200 | 1 |

TABLE I-continued

Experimental conditions for the plasma polymerization process.

| Sample Code | RF Power (watts) | Acetylene concentration (milliTorr) | Treatment time (hrs) |
|---|---|---|---|
| KS 4 | 250 | 200 | 1 |
| RP-P534 | 250 | 200 | 1 |
| EP-P434-5 | 150 | 200 | 1 |

Characterization of the Samples a. Thermogravimetric Analysis

A Perkin Elmer TGA was used for thermogravimetric analysis of the samples. The samples were heated from 50° C. to 800° C. at 10° C./min in an air atmosphere. The thermal degradation behavior of pure plasma polymerized acetylene was first studied. Pure plasma polymerized acetylene starts decomposing at 265° C. and the decomposition is complete at 600° C. Based on this observation, the weight losses for the coated and uncoated fullerenic soots were calculated in the aforementioned region of decomposition of said plasma polymerized acetylene. The difference in weight loss between the coated and uncoated samples corresponds to the amount of plasma polymerized acetylene formed on its surface.

The TGA thermograms of various carbon black samples are shown in FIGS. 5A-5F. Calculated weight losses for each sample are shown in Table II. Among the different samples, fullerenic soot E-P434 gave high amount of deposition of plasma polymerized acetylene. The fullerenic graphite RP-P534 did not show appreciably high deposition than its precursor, the primary synthetic graphite KS 4. However, the graphitic samples showed a somewhat higher deposition than the E-250g and EM-M131.

The fullerenic soot E-P434 gave also high deposition under a different process condition.

TABLE II

Calculated weight losses for various plasma coated samples

| Sample | Weight loss (%) |
|---|---|
| E-250g Ac | 2.3 |
| E-MM131-Ac | 1.8 |
| E-P434-Ac | 14.0 |
| KS 4-Ac | 3.1 |
| RP-P534-Ac | 3.4 |
| E-P434 Ac-5 | 12.2 | b. X-Ray Photoelectron Spectroscopy

Surface analysis was performed on a Quantera XPS from Physical Electronics equipped with an Al Kα X-ray source (1486.6 eV). The spectra were obtained with pass energy of 224 eV and the elemental scans were acquired at 55 eV and 0.1 eV stepwise.

The concentration of carbon and oxygen on the surface of fillers before and after modification is shown in Table III.

TABLE III

Elemental concentration on various samples

| Sample | C % | O % |
|---|---|---|
| E-250g | 98.81 | 1.19 |
| E-250g-Ac | 96.95 | 3.05 |
| E-MM131 | 98.46 | 1.54 |
| E-MM131-Ac | 96.58 | 3.42 |

TABLE III-continued

Elemental concentration on various samples

| Sample | C % | O % |
|---|---|---|
| E-P434 | 97.36 | 2.64 |
| E-P434-Ac | 92.62 | 7.38 | c. Surface Area Measurements

The BET surface area and CTAB surface area of the fullerenic soot before and after modification was measured. After the deposition of the acetylene plasma polymer, the BET as well as CTAB surface area were found to be decreased. Results are shown in Table IV.

TABLE IV

Surface areas of treated and untreated fullerenic soot.

| Sample | BET Nitrogen surface area (m²/g) | CTAB surface area (m²/g) |
|---|---|---|
| E-P434 | 69.8 | 72 |
| E-P434-Ac | 637 | 61 | d. Transmission Electron Microscopy.

The carbon particles of the sample E-P434 were subjected to TEM imaging before and after treatment according to the conditions specified in Table 1. It can be seen that the thickness of the coating was in the range of 3-5 nm in most areas of the core particles, and in some areas it extended up to a range of 7-9 nm.

Conclusion:

The surface of fullerenic soot E-P434 can be readily modified by depositing a plasma polymerized acetylene layer through plasma polymerization. The thickness of the layer formed on the surface is in the range of about 5 nm.

Example 2: Surface Energy of Treated and Untreated Carbon Black

Non-fullerenic furnace carbon black (N330) was subjected to treatment with acetylene plasma for one and four hours, respectively (N330). The surface energy of treated samples was compared to fullerenic soot particles treated for one hour in an acetylene plasma. The results of solvent immersion tests are depicted in the Scheme below:

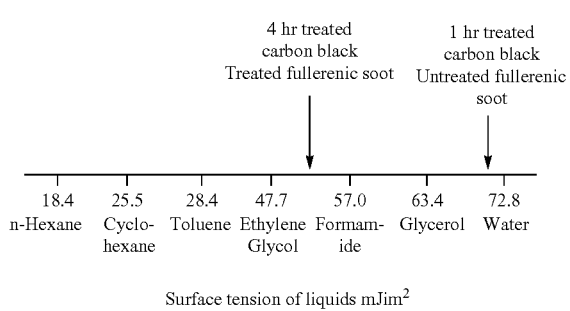

Thus, the coated carbon black shows appreciable reduction in surface energy. The modified fullerene soot after 1 hr treatment showed surface energy reduction similar to a 4 hr treated furnace carbon black (N330).

Example 3: Plasma Coated Fullerenic Soot for Use in Polymer Blends

The fullerenic soot in the fluffy form was obtained from Timcal Graphite and Carbon, Belgium. The sample code was RP-P579. The BET specific surface area of the fullerenic soot was 66.8 m²/g. The monomer used for plasma polymerization was acetylene (99.6% purity) as supplied by Matheson Trigas, Ohio, USA.

The rubbers used for the experiments were a solution of Styrene-Butadiene-Rubber (S-SBR), Acrylonitrile-Butadiene-Rubber (NBR) and an Ethylene-Propylene-Diene rubber (EPDM). S-SBR was supplied by Lanxess Corporation, Germany: Buna VSL 5025-OHM with Mooney viscosity ML (1+4)100° C.: 65, vinyl content 50 wt %, styrene content 25 wt %. NBR was also supplied by Lanxess Corporation, Germany: Perbunan NT 3446 with Mooney viscosity ML (1+4)100° C.: 45, acrylonitrile content 34.7±1 wt %. EPDM rubber was supplied by DSM Elastomers B.V. the Netherlands: Keltan 4703 with Mooney viscosity ML (1+4)125° C.: 65, ethylene content 48 wt % and ethylidene norbornene content 9.0 wt %.

Rubber compounds with fullerenic soot are denoted as FS and those with the plasma-coated fullerenic soot are denoted as PCFS.

Plasma polymerization was carried out in a Radio-frequency (RF) plasma tumbler reactor. After introduction of 100g of fullerenic soot, the chamber was evacuated to a pressure of 10 Pa. Then monomer was injected into the reaction chamber under steady flow conditions, maintaining a pre-determined monomer pressure inside the chamber. Subsequently RE-power was applied. A frequency of 13.56 MHz was applied. The conditions of the process were varied as given in Table V, in order to find an optimized condition for the process based on the amount of plasma-polymer deposited on the surface of the soot.

TABLE V

Experimental Conditions Employed for the Plasma Polymerization onto Fullerenic Soot

| Sample Code | RF Power (Watts) | Monomer Concentration (Pa) | Treatment Time (hr) | TGA weight loss (%) |
|---|---|---|---|---|
| RP-P579-1 | 80 | 20 | 1 | 1.72 |
| RP-P579-2 | 100 | 40 | 1 | 2.15 |
| RP-P579-3 | 100 | 40 | 2 | 4.01 |
| RP-P579-4 | 100 | 50 | 2 | 3.9 |
| RP-P579-5 | 100 | 50 | 2.5 | 5.06 |
| RP-P579-6 | 100 | 40 | 2.5 | 5.5 |

Resistivity of Plasma Coated Fullerenic Soot Samples

Figure 6:
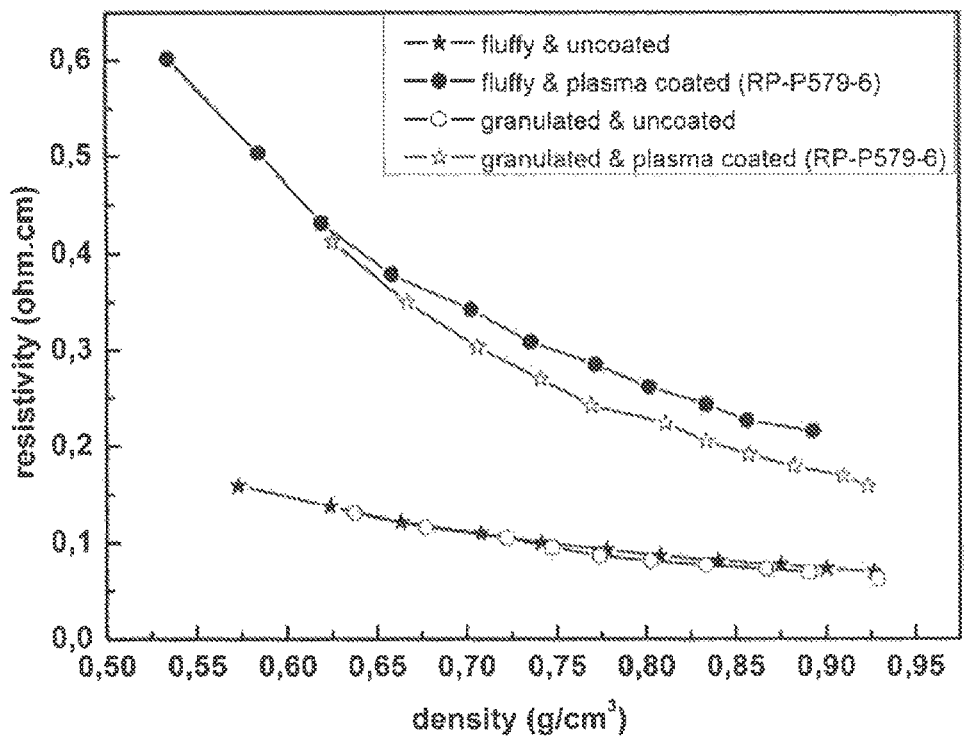
FIG. 6 shows resistivities of coated versus uncoated fullerenic soot samples.
Figure 7:
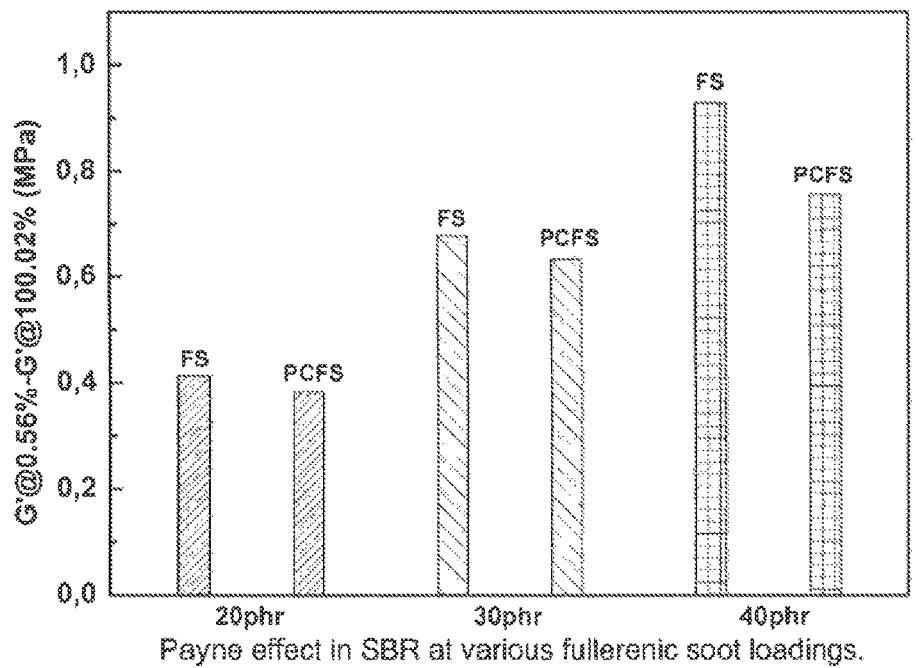
FIG. 7 shows the Payne effect in SBR at various fullerenic soot loadings.
Figure 8:
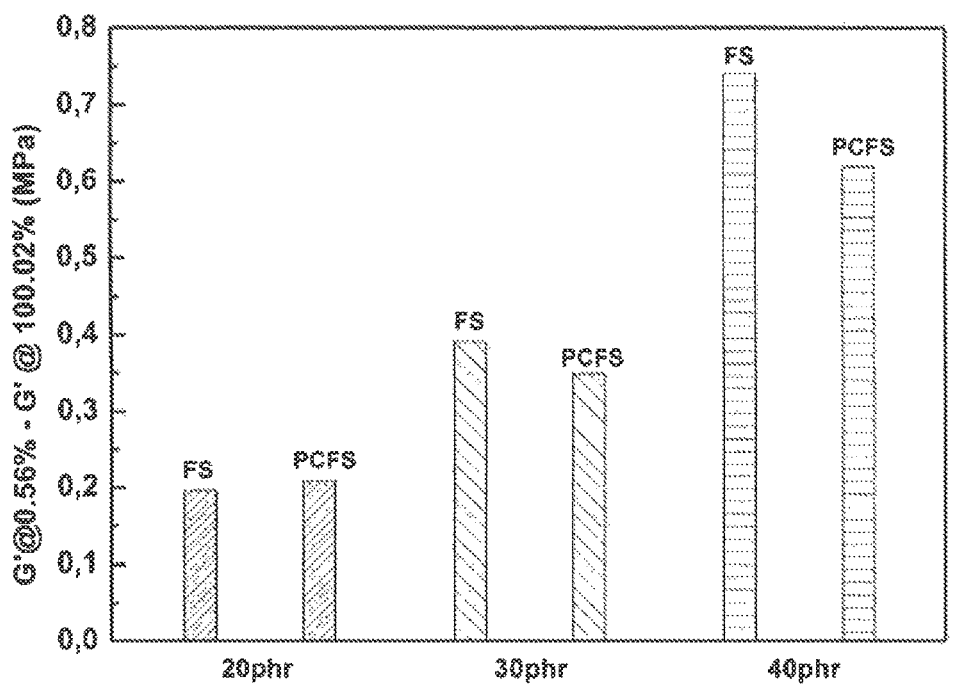
FIG. 8 shows the Payne effect in NBR at various fullerenic soot loadings.
Figure 9:
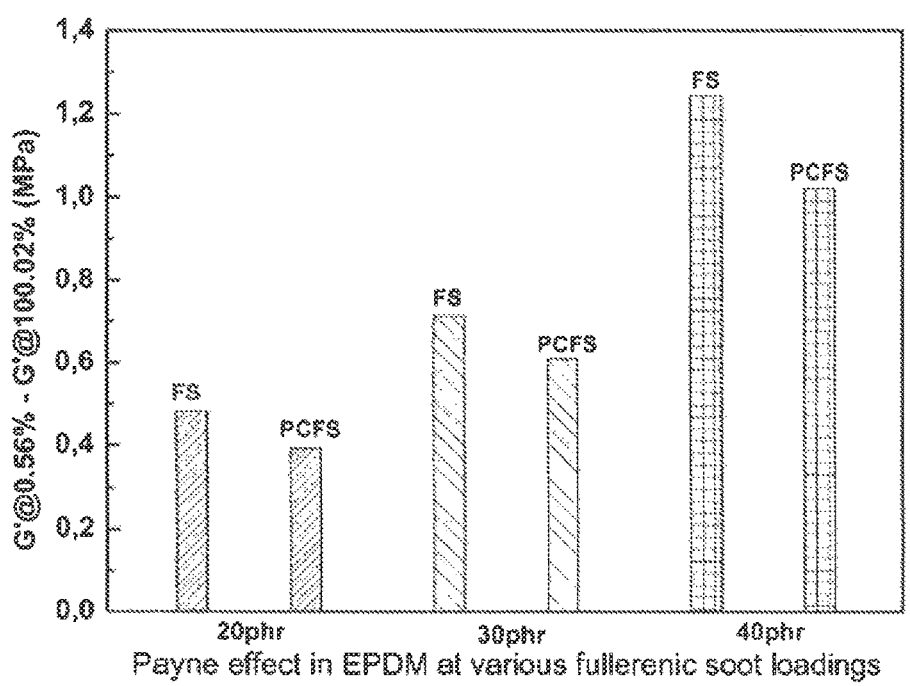
FIG. 9 shows the Payne effect in EPDM at various fullerenic soot loadings.
Figure 10:
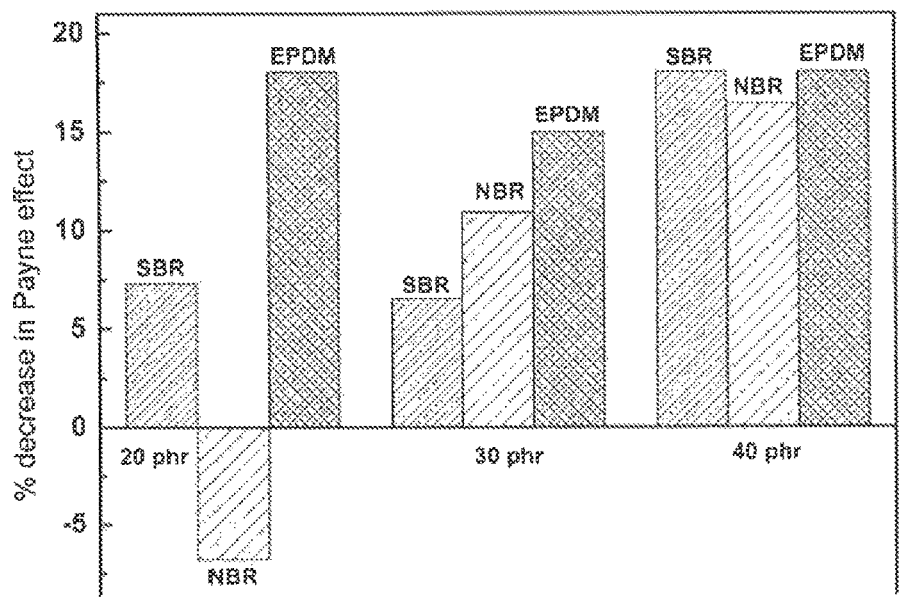
FIG. 10 shows percentage reduction of the Payne effect in different rubbers.

The resistivity of plasma coated versus uncoated fullerenic soot samples is depicted in FIG. 6. It can be derived from the data shown in the Figure that the resistivity of fluffy fullerenic soot increases substantially after the deposition of plasma coating. This directly translates to less carbon-carbon contacts in the plasma-coated state. For application in rubber, the fluffy fullerenic soot was granulated. The conductivity measurements carried out on the granulated sample also show an increased resistivity relative to the uncoated version. Compared to the fluffy plasma-coated fullerenic soot, there is some reduction in resistivity, especially at higher compacted densities. Still, the resistivity values are substantially higher than observed for the uncoated version. This means that even after granulation there is still a significant amount of plasma coating on the surface of fullerenic soot, indicating a good adherence of the coating. In other words, by coating fullerenic soot through plasma polymerization a significant increase in resistivity of the resulting composition is observed.

Rubber Mixing and Curing

Rubber compounds with fullerenic soot samples were prepared according to the formulations given in Table VI below. The mixing was carried out in a Brabender Plasticorder internal mixer with a chamber volume of 390 ml. The mixing procedure employed is mentioned in Table VII. The starting temperature was 50° C. The mixing conditions were optimized to obtain a mixing energy smaller than 500 MJ/m³. This was done to obtain a situation comparable with that of industrial scale mixing. The rotor speed was 50 rpm. After mixing, the compound was discharged and was sheeted out on a two roll mill. The addition of sulfur and accelerators was carried out on a two roll mill as well.

After the addition of curatives, the curing properties of the compound were determined using a RPA 2000 from Alpha Technologies. The optimum vulcanization time $t_{90}$ and scorch time $t_{92}$ were determined. The compounds were subsequently cured in a Wickert laboratory press at 160° C. and 100 bar pressure.

TABLE VI

Compound Formulations in phr

| Component | | | |
|---|---|---|---|
| SBR, NBR or EPDM | 100 | 100 | 100 |
| Carbon black | 20 | 30 | 40 |
| Zinc oxide | 4 | 4 | 4 |
| Stearic acid | 2 | 2 | 2 |
| TMQ | 1 | 1 | 1 |
| Sulphur | 2.5 | 2.5 | 2.5 |
| CBS | 1.98 | 1.98 | 1.98 |
| TOTAL | 131.5 | 141.5 | 151.5 |

TABLE VII

Mixing Scheme

| Time (min) | Action |
|---|---|
| 0.0 | Open ram, add rubber |
| 0.00-1.30 | Rubber mixing |
| 1.30-2.10 | Add ZnO, stearic acid, TMQ, and ½ fullerenic soot |
| 2.10-3.10 | Mixing |
| 3.10-3.50 | Add ½ fullerenic soot |
| 3.50-5.50 | Mixing |
| 5.50 | Dump |

Results

Behavior of Plasma Coated Fullerenic Soot in Rubber

As described above, plasma coated fullerenic soot was mixed with the different rubbers SBR, NBR and EPDM. The mixing energy was optimized to be smaller than 500 MJ/m³. Strain sweep measurements of uncured compounds were performed on the RPA 2000. The storage modulus was measured in the range of 0.56%-100.04% strain. The temperature and frequency were kept constant at 60° C. and 0.5 Hz.

The Payne effects of the plasma coated fullerenic soot filler at various filler loadings in SBR, NBR and EPDM are shown in FIGS. 7 to 10, respectively. The difference in G' value at 0.56% strain and 100.04% strain can be represented as the Payne effect. The Payne effect is usually used to obtain information regarding the filler-filler interaction in a rubber matrix. The higher the storage modulus (G') value at lower strains, the higher is the filler-filler interaction. During the strain sweep measurement, the storage modulus value decreases due to breakdown of the filler-filler network to obtain similar G' values at high strains, irrespective of the filler-filler interaction to begin with at low strain.

The Payne effect is usually employed for rubber compounds with filler contents above the percolation threshold, which is—depending on the specific grade of carbon black—usually in the range of 30 phr (parts per hundred of rubber). The plasma coated fullerenic soot shows a lower Payne effect in all rubber compounds and at all filler concentrations. The difference in Payne effect value becomes more prominent at higher filler loadings. The relative decrease of the Payne effect in different rubbers is demonstrated in FIG. 10. It clearly shows that at lower filler loadings (20 and 30 phr), the decrease of the Payne effect is most prominent in EPDM rubber. But at higher filler loadings the effect is almost the same for the other rubber samples tested.

Figure 11:
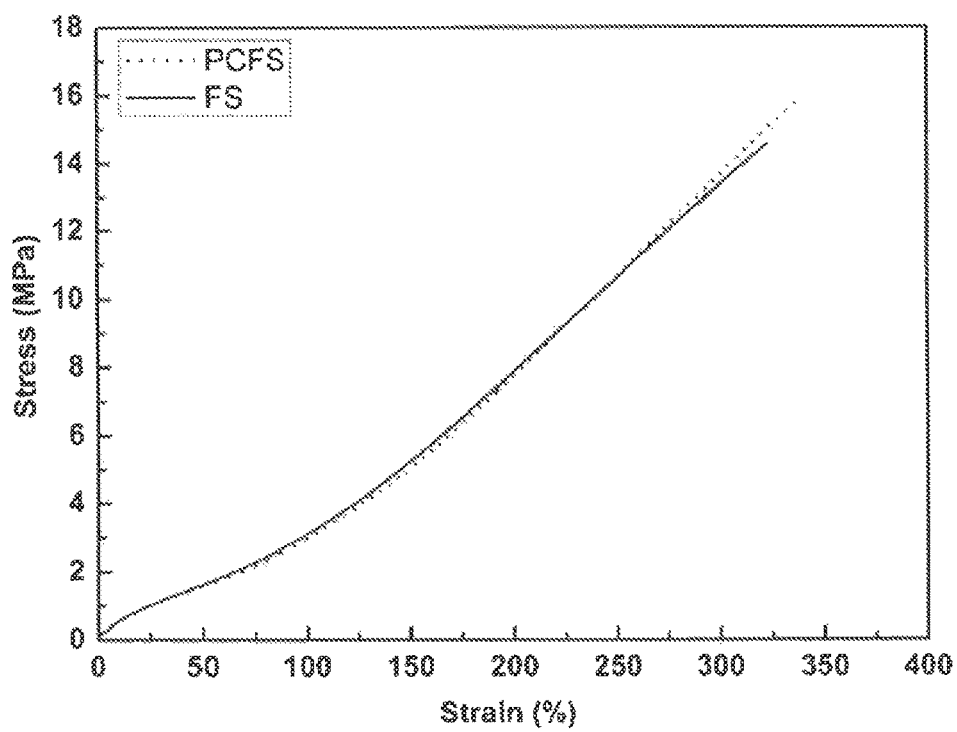
FIG. 11 shows the stress-strain curve of SBR with 40 phr plasma-coated fullerenic soot.
Figure 12:
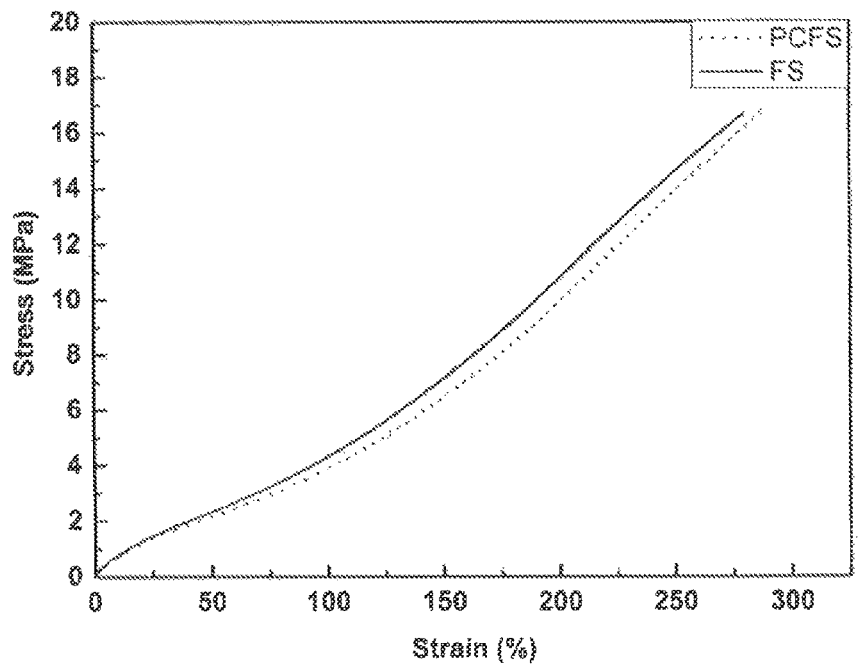
FIG. 12 shows the stress-strain curve of NBR with 40 phr plasma-coated fullerenic soot.
Figure 13:
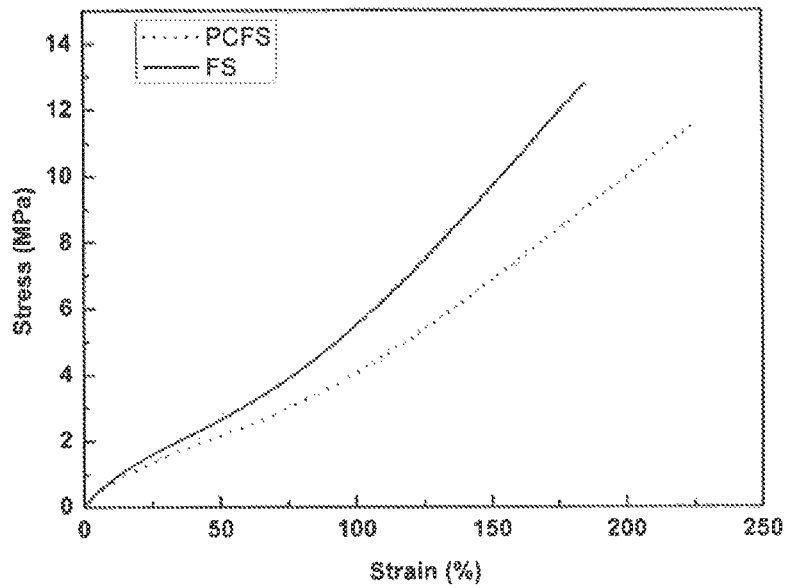
FIG. 13 shows the stress-strain curve of EPDM with 40 phr plasma-coated fullerenic soot.

The stress-strain properties of the cured compounds with the carbon black samples were measured according to ISO 037. The measurements were carried out on a Zwick Z 1.0/TH 1 S tensile tester. The stress-strain curves of vulcanisates of SBR, NBR and EPDM with 40 phr filler loading are shown in FIGS. 11-13, respectively. SBR with plasma-coated fullerenic soot showed a slight improvement in tensile strength. In the case of NBR, no significant improvement was observed. In the case of EPDM, there is an appreciable reduction in tensile strength, accompanied by an improvement in elongation at break.

Carbon black can interact chemically and physically with elastomers and thus contribute to the reinforcement of the elastomer. It is widely accepted to use the carbon black-rubber interaction parameter to denote and quantify the interaction between rubber and carbon black. It is commonly referred to as the slope of the stress-strain curve in a relatively linear region, typically within the range of extension ratios from 100 to 300%

Carbon black-rubber interaction parameter $$\sigma = \frac{\sigma_b - \sigma_a}{\lambda_b - \lambda_a}$$

Where $\sigma_b$ and $\sigma_a$ are the stresses at corresponding strains $\lambda_b$ and $\lambda_a$: 300 and 100, respectively. The modulus development at these elongations has been shown to depend on strong adhesion between the carbon black surface and the polymer. While comparing different carbon blacks, the slope of the stress strain curve was found to be a better indicator of the polymer-filler interaction than the individual modulus values.

The calculated σ-values are tabulated in Table VIII. In the case of SBR and NBR a slight increase in σ-value was observed, whereas in the case of EPDM a significant reduction in carbon black-rubber interaction was observed.

TABLE VIII

Carbon black-rubber interaction parameter for different system

| Sample | FS | PCFS |
|---|---|---|
| SBR | 5.5 | 5.8 |
| NBR | 7.5 | 7.8 |
| EPDM | 8.5 | 5.8 |

The invention claimed is:

1. A process for producing an active filler comprising:
providing carbon residue particles comprising fullerene-type nanostructures; and
plasma polymerizing a monomer on the carbon residue particles to produce an active filler suitable for use in rubber,
wherein the carbon residue particles were produced by exposing a carbon precursor selected from carbon black, graphite, expanded graphite and combinations thereof to any one or more of: 1) a high temperature plasma treatment; 2) a radio frequency plasma treatment; 3) combustion; 4) an arc process; or 5) laser ablation, and
wherein the carbon residue particles have carbon rings on carbon particle surfaces.

2. The process of claim 1, wherein the plasma polymerizing is carried out in a fluidized bed plasma polymerization reactor.

3. The process of claim 1, wherein the thickness of a plasma polymer formed on the carbon residue is in the range of 3 nm to 9 nm.

4. The process of claim 1, wherein a plasma polymer formed represent 1.0% to 30% of the mass of the active filler.

5. The process of claim 1, wherein a plasma polymer formed represents 1.5% to 20% of the mass of the active filler.

6. The process of claim 1, wherein the carbon residue particles are produced by a combustion process, an arc process, or by laser ablation.

7. The process of claim 1, wherein the monomer comprises a hydrocarbon monomer.

8. The process of claim 1, wherein the plasma polymer comprises at least one carbon-carbon double bond.

9. The process of claim 1, wherein the plasma polymerization is carried out in less than 4 hours.

10. The process of claim 1, wherein the plasma polymerizing of the monomer produces a layer of plasma polymer having a lower surface energy than the surface energy of the carbon particle.

11. The process of claim 10, wherein the surface energy is less than 65.0 mJ/m2.

12. The process of claim 10, wherein the surface energy is less than 60.0 mJ/m2.

13. The process of claim 10, wherein the thickness of the layer of plasma polymer formed on the carbon particle is in the range of 3 nm to 9 nm.

14. The process of claim 10, wherein a plasma polymer formed represents 1.0% to 30% of the mass of the carbon particle.

15. A process for producing a polymeric composition comprising:
providing an active filler comprising carbon residue particles and a plasma polymer adjacent to a surface of the carbon residue particles having carbon rings; and
incorporating the active filler into one or more polymers, wherein the carbon residue particles were produced by exposing a carbon precursor selected from carbon black, graphite, expanded graphite and combinations thereof to any one or more of: 1) a high temperature plasma treatment; 2) a radio frequency plasma treatment; 3) combustion; 4) an arc process; or 5) laser ablation, and the carbon residue particles comprise fullerene-type nanostructures.

16. The process of claim 15, wherein the polymer is a natural or synthetic elastomer.

17. The process of claim 15, wherein the polymer is selected from the group consisting of natural rubber, styrene-butadiene-rubber, acrylonitrile-butadiene-rubber, or ethylene-propylene-diene rubber.

18. The process of claim 15, characterized in that ultimate resistivity is within a range between 103 and 1013 Ohmcm.

19. The process of claim 15, wherein the active filler is used to compatibilize polymers with low affinity to each other and different affinity to the carbon filler.

20. The process of claim 15, wherein the polymeric composition is a tire.

* * * * *